United States Patent
Balzer et al.

(10) Patent No.: US 6,612,458 B2
(45) Date of Patent: Sep. 2, 2003

(54) DOUBLE-WALL FUEL CONTAINER

(75) Inventors: Martin Balzer, St. Augustin (DE); Dieter Hess, Swistal (DE); Werner Daubenbuechel, Overath (DE); Michael Pappert, Eltorf (DE); Roger Stehr, Dusseldorf (DE); Peter Kluesener, Bonn (DE)

(73) Assignee: SIG Kautex GmbH & Co. KG, Bonn (DE)

(*) Notice: Subject to any disclaimer, the term of this patent is extended or adjusted under 35 U.S.C. 154(b) by 114 days.

(21) Appl. No.: 09/992,495

(22) Filed: Nov. 6, 2001

(65) Prior Publication Data

US 2002/0053568 A1 May 9, 2002

(30) Foreign Application Priority Data

Nov. 6, 2000 (DE) .......................... 100 54 876

(51) Int. Cl.⁷ .............................................. B65D 43/20
(52) U.S. Cl. .................... 220/562; 220/4.14; 220/4.13; 220/62.18; 220/62.22
(58) Field of Search ................ 220/562, 4.14, 220/4.3, 62.18, 62.22

(56) References Cited

U.S. PATENT DOCUMENTS

| 3,779,420 A | * | 12/1973 | Knaus .................. 220/4.14 |
| 5,384,172 A | * | 1/1995 | Takado et al. ............. 428/35.7 |
| 5,398,839 A | * | 3/1995 | Kleyn .................... 220/560.03 |
| 5,567,296 A | | 10/1996 | Luch ...................... 205/158 |
| 6,409,040 B1 | * | 6/2002 | Distelhoff et al. ......... 220/562 |
| 2002/0047015 A1 | | 4/2002 | Distelhoff et al. ......... 220/562 |

FOREIGN PATENT DOCUMENTS

| DE | 3600177 | 7/1986 | ........... B65D/1/40 |
| DE | 198 14 314 A1 | 10/1999 | ........... B29D/22/00 |
| DE | 19849820 | 5/2000 | ........... B60K/15/03 |
| DE | 19853097 | 5/2000 | ........... B60K/15/035 |
| DE | 198 53 097 A | 5/2000 | ........... B60K/15/035 |
| WO | WO 00/48859 | 8/2000 | ........... B60K/15/035 |

* cited by examiner

*Primary Examiner*—Joseph M. Moy
(74) *Attorney, Agent, or Firm*—Grossman, Tucker, Perreault & Pfleger, PLLC

(57) ABSTRACT

A double-wall fuel container of plastic material is composed of at least two shell portions which are welded together. The half-shell portions are each in the form of double-wall blow moldings, with a gap being kept free at least in a region-wise manner between the walls of the blow moldings.

10 Claims, 3 Drawing Sheets

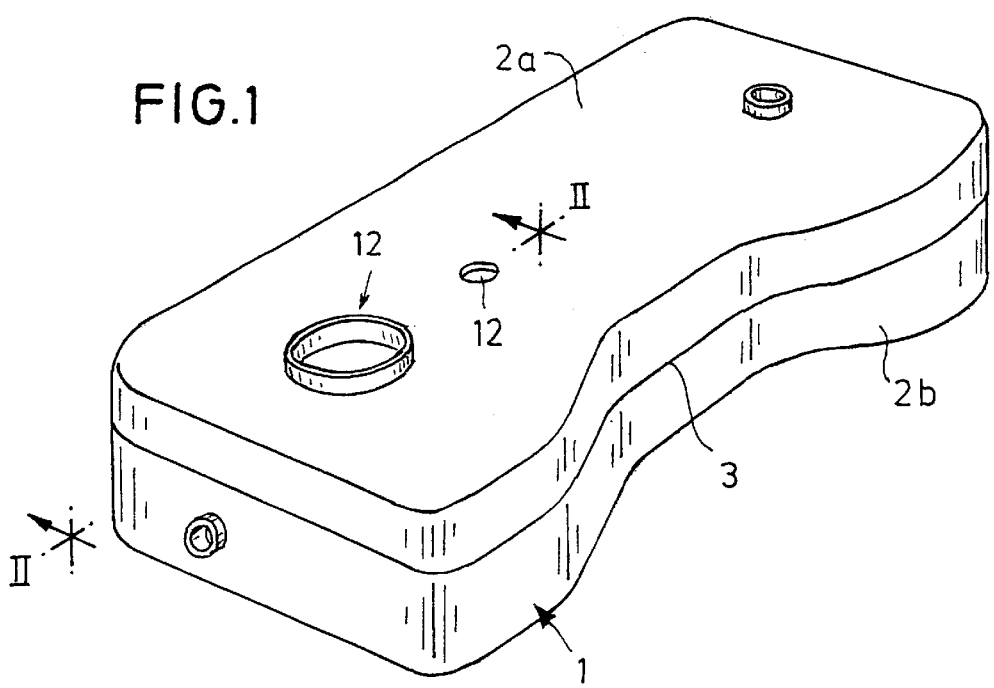
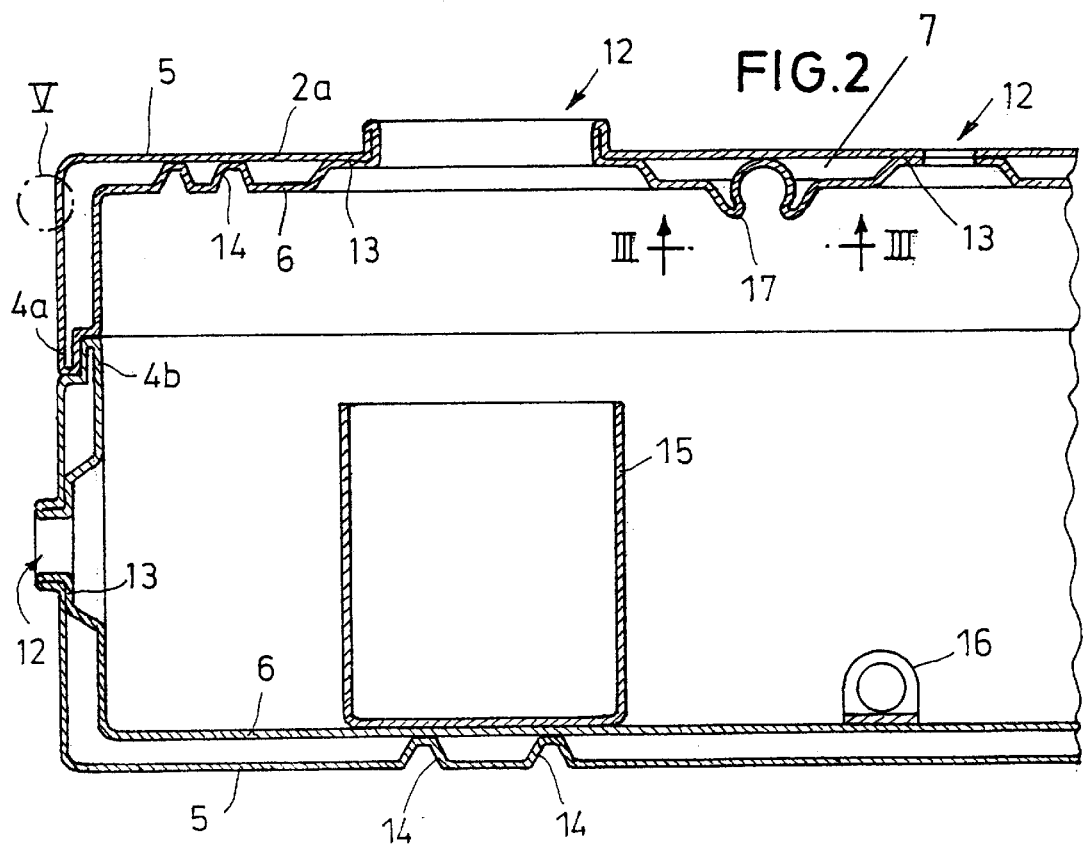

DOUBLE-WALL FUEL CONTAINER

FIELD OF THE INVENTION

The invention concerns a double-wall fuel container of plastic material, for example as a motor vehicle fuel tank.

BACKGROUND OF THE INVENTION

A double-wall fuel container such as a motor vehicle fuel tank of plastic material may typically comprise at least two elements in shell form, which are joined together by joining of the materials thereof.

In the context of fuel containers generally, it is known that single-layer fuel containers consisting of polyethylene are more or less permeable in relation to hydrocarbons, with the result that hydrocarbons diffuse through the wall of the tank and are discharged to the ambient atmosphere, which is undesirable. Fuel tanks are the subject of increasing demands in terms of the permeability thereof in relation to hydrocarbons.

Many attempts have been made to reduce the level of hydrocarbon emissions from fuel tank systems. To further those aims, a fuel tank may be made by a co-extrusion blow molding process, with the wall thereof comprising a laminate with one or more barrier layers which afford a low level of permeability for hydrocarbons. Such tanks generally satisfy the demands in relation to maximum admissible levels of hydrocarbon emissions.

However, problems still arise in this respect in regard to connecting openings in the tank, which are required to form a sealing seat for connection members, valves and the like, while in addition welded seams both in the case of fuel containers which are made up of a plurality of component parts made by an injection molding process and also in the case of fuel containers which were obtained by extrusion blow molding represent a possible source of emissions.

In an attempt to reduce the rate of permeation of a fuel container, for example DE 36 00 177 A1 proposes that the fuel container is made up in a double-wall structure comprising an inner container and an outer enclosure or casing which together form a sealed intermediate space with which there communicates a conduit for the discharge of gas or air. Admittedly, with such an arrangement, a large part of the hydrocarbons which diffuse directly through the tank wall can be trapped in a filter element, but here it is necessary for conduits to be passed through the outer casing a plurality of times, and the points at which the conduits pass through the outer casing in that way also represent sources of hydrocarbon emission. Such conduits and conduit connections which are disposed outside the container have to be optimised in terms of their emissions, and that is highly complicated and expensive and sometimes also encounters limits.

The endeavour therefore is to move as many connecting locations and conduits as possible into the tank or container. For that purpose for example DE 198 49 820 A1 discloses gas-tightly mounting in the region of the tank, on the outside thereof, at least one cover member which in conjunction with the tank wall delimits a space which is screened off with respect to the ambient atmosphere and within which connections, connecting conduits and the like are disposed. That cover member is gas-tightly welded to the wall of the tank. It is also possible to dispose therebeneath for example an activated carbon filter for receiving and separating off any free hydrocarbons which may occur.

A similar design configuration is to be found for example in WO 00/48859 where the tank is also gas-tightly welded to a large-area cover member in the form of a hood.

Endeavours are increasingly being made however to move all the connecting locations and conduits, if possible, into the interior of the container or tank. That is to be implemented particularly well in fuel containers which are made up of large component parts, for example two shell portions.

DE 198 53 097 for example discloses such a fuel container having a wall which is produced by an injection molding process from plastic material and which is of a two-part nature. Each half of the tank in turn comprises shell portions which are arranged one above the other and between which a slit or gap is kept free. Fuel vapors which pass into the gap are discharged therefrom and filtered. With such a tank, all installation components therewithin can be fitted under advantageous and convenient installation conditions, before the shell portions are welded together. Manufacture of such a tank however gives rise to the problem that the permeability properties of the plastic material used can scarcely be improved for example by adopting a multi-layer configuration for the tank wall. It is not possible for multi-layer shell portions of that nature to be produced by an injection molding procedure. Thermoshaping shell portions using a multi-layer semi-manufactured article usually gives rise to difficulties in terms of final manufacture as the processing temperatures for the individual components of the laminates which are usually employed are comparatively far apart.

SUMMARY OF THE INVENTION

An object of the present invention is to provide a fuel container of plastic material, which is of such a design configuration that it can be produced in particular inexpensively while as little fuel vapor as possible is permitted to pass into the ambient atmosphere through the container wall.

Another object of the present invention is to provide an improved fuel container of plastic material of a double-wall configuration, which affords improved resistance to permeability of hydrocarbon fuel vapors therethrough.

Yet another object of the present invention is to provide a plastic fuel container of double-wall structure which can be produced using a simple operating procedure.

In accordance with the principles of the present invention the foregoing and other objects are attained by a double-wall fuel container, for example as a motor vehicle fuel tank, of plastic material, composed of at least first and second elements in shell form, which are joined together by joining of the respective materials thereof. The elements in shell form are each in the form of a double-wall blow molding which are respectively co-extruded in a multi-layer configuration at least in a region-wise manner. A gap is kept free at least in a region-wise manner between the respective walls thereof.

A fuel container or tank produced in that way has various advantages over previous fuel containers, which are to be attributed more particularly to the fact that the individual constituent elements of the fuel container are co-extruded in a multi-layer configuration. On the one hand, that affords the possibility of reducing the permeability of the plastic material used, with measures and procedures which are known for that purpose. On the other hand, the arrangement according to the invention enjoys the advantages of multi-part containers, in terms of mounting and attaching conduits and connecting elements. All visible surfaces of the components can enjoy an outstanding surface nature, which is usually not otherwise the case in regard to the internal surfaces of fuel tanks which are conventionally produced by blow molding.

In that situation the plastic material leaves behind otherwise relatively large flow markings, by virtue of the fact that no contact with a molding tool actually takes place in the interior of a blow-molded component. In addition, conventionally blow-molded fuel tanks suffer from irregularities in the wall thickness thereof, by virtue of different expansion distances on the part of different parts of the preform from which the blow-molded tank is produced. The fuel container according to the invention has thereover the advantage that the internal contour of the container has a defined smooth surface.

The elements in shell form may each of such a configuration that they form any division, including an asymmetrically extending one, in the assembled fuel container. For example an element in shell form can be in the form of a trough-like element or a bowl-like element, while the element which is to be fitted thereto to constitute the finished container can form a cover member.

In a preferred feature of the invention the double-wall elements are each in the form of a half-shell portion, with the shell portions being suitably welded together to form the container.

In a further preferred feature of the invention the walls of the elements forming the container can each be produced at least in a region-wise manner from a laminate with at least one barrier layer for hydrocarbons. Such barrier layers can be formed for example from EVOH (ethylene vinyl alcohol). By virtue of the double-wall nature of the elements forming the fuel container, it is possible to use less expensive barrier materials instead of EVOH, and that can contribute to further reducing the production costs of the fuel container. It is however also possible to provide a barrier layer in only one respective one of the two walls of the blow-molded elements. That could be easily implemented in the course of manufacture by the preform for producing the finished molded article being extruded only with a barrier layer extending over half the periphery thereof.

In a further preferred feature of the fuel container according to the invention, barrier layers for hydrocarbons are provided only in the wall regions of the elements, which form the outsides of the container.

A further preferred feature of the invention provides that there are means for venting the cavity of the elements which are in the form of hollow moldings. For example, appropriate openings for the intake and discharge of air can be provided at one or more suitable locations on the shell portions for making up the fuel container. In that case, it is desirable for the cavity of the elements to communicate with a filter element. In operation of a motor vehicle to which the fuel container according to the invention is fitted, it is possible for example to provide for active flushing of the cavity of the elements with air.

Passage configurations, subdivision means or partitions and other contours in the container wall can be afforded by welding wall regions of the elements, which are arranged in mutually superposed relationship, in other words, by the procedure known as wall-to-wall welding, whereby it is possible at the same time to provide for stabilisation of the fuel container. Passages at wall-to-wall welds of calibrated quality for passing conduits and connections therethrough are also an option in the design configuration according to the invention.

At least the regions, which form the inside wall of the container, of at least one element, preferably the element forming the top side of the container in the position of use thereof, can be of a profiled nature to receive and/or fix conduits and other fitments, and this can also be achieved by the above-mentioned wall-to-wall welding.

Alternatively, it is likewise easily possible to provide insert members for receiving conduits or fitments, such as for example of a reservoir, which involve an intimate join to the inside wall of the container in the blow molding procedure.

It can further be provided that mutually superposed wall regions are welded together, forming conduits and/or ducts therethrough, so that the installation of separate conduits becomes at least in part superfluous.

Finally, it is also possible to provide that the elements or shell portions are welded together in such a way that, in the region of the welded seam, they form between them at least one vent duct which extends at least in part around the periphery thereof and which can be vented in a similar manner to the above-mentioned cavity between the walls of the elements making up the fuel container. The permeability of the finished fuel container in relation to hydrocarbons can be still further reduced in that way.

The two shell portions of the fuel container can be joined together for example by heating element welding. Other ways of making the joins, for example by adhesive, can also be envisaged within the framework of the present invention.

Further objects, features and advantages of the invention will be apparent from the description hereinafter of a preferred embodiment thereof.

BRIEF DESCRIPTION OF THE DRAWING

FIG. 1 is a perspective view of a fuel container according to the invention,

FIG. 2 is a view in section through the fuel container of FIG. 1 along line II—II therein.

DESCRIPTION OF THE PREFERRED EMBODIMENT

Figure 3:
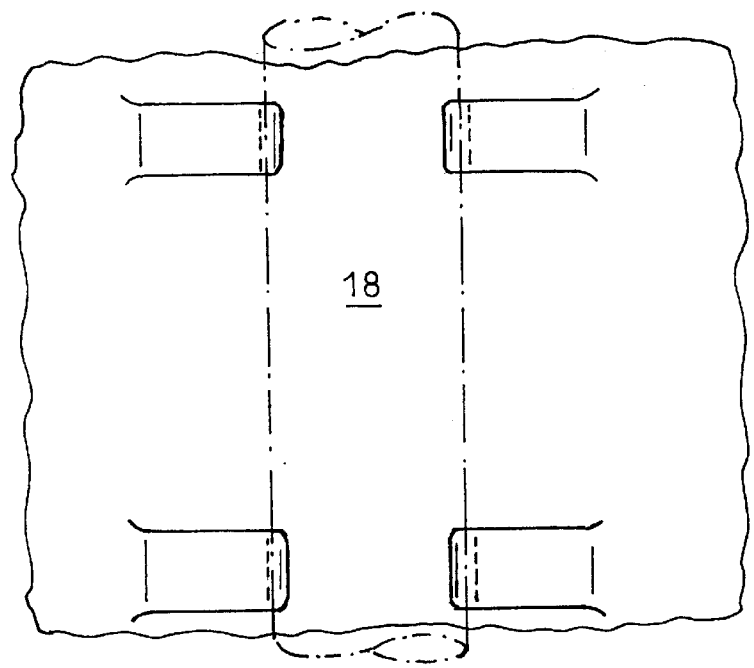
FIG. 3 is a view taken along lines III—III in FIG. 2.

Referring firstly to FIG. 1, a fuel container of plastic material, of a double-wall nature, for example as a motor vehicle tank, is composed of first and second shell portions 2a and 2b which are produced by an extrusion blow molding procedure. In the position of use of the fuel container the shell portion 2a will be the upper shell portion and the shell portion 2b will be the lower shell portion. The two shell portions 2a and 2b are welded together at a peripherally extending seam 3. In the illustrated embodiment, for reasons of stability, the end faces, which are welded together, of the shell portions 2a, 2b each have a peripherally extending step as indicated at 4a and 4b in FIG. 2. The step 4a on the upper shell portion 2a is disposed inwardly and the step 4b of the upper shell portion 2b is disposed outwardly. In that way, the upper shell portion 2a and the lower shell portion 2b have a mutual centering effect and the upper shell portion 2a embraces the lower shell portion 2b in positively locking relationship.

As already mentioned above, each of the shell portions 2a, 2b is in the form of a hollow molding produced by an extrusion blow molding process, and was obtained by co-extrusion of a multi-layer tubular preform. Co-extrusion of such laminates is state of the art so that the procedures and techniques involved in that respect do not need to be discussed in fuller detail hereinafter.

It will be noted that, by virtue of the fact that the shell portions 2a, 2b are produced in the form of blow moldings, they are of a double-wall nature, with a gap 7 being kept free in an at least region-wise manner between the walls 5 and 6 of the fuel container. It will be noted from FIG. 2 that reference 5 denotes the outside wall of the container and reference 6 denotes the inside wall of the container.

Figure 5:
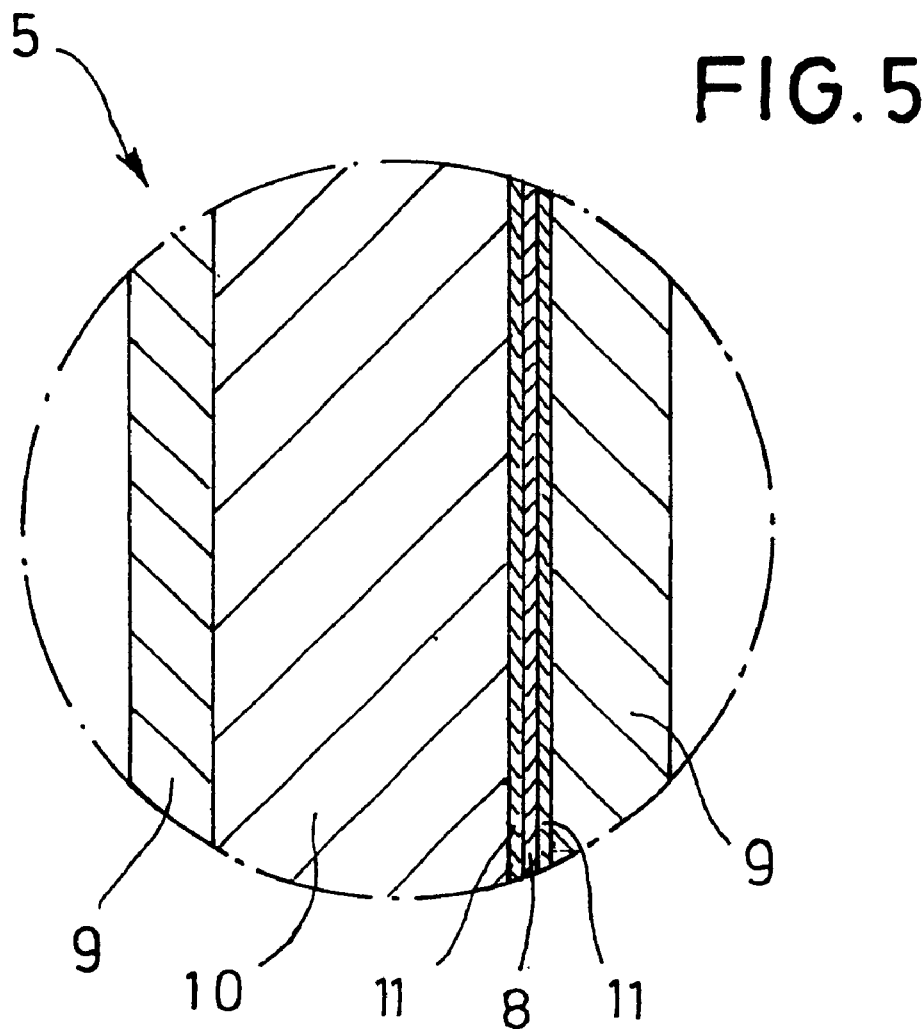
FIG. 5 is a view on an enlarged scale of a part of the outside wall of the fuel container.

In the illustrated embodiment, looking at FIG. 5, it will be seen that the outside wall 5 of the container includes a barrier layer 8 for hydrocarbons. FIG. 5 generally shows the layer structure of the outside wall 5 of the container, as well as the provision of the barrier layer 8 therein.

Referring therefore now to FIG. 5, the outside wall 5 of the container, in the structure diagrammatically illustrated therein, comprises a total of six parallel layers, of which the two outer layers 9 each comprise for example polyethylene. Reference numeral 10 denotes a layer of regenerated or reclaimed material. Regenerated or reclaimed material is a term used to denote recycled material, which has occurred for example in the production of the shell portions 2a, 2b or in the production of other blow molded components, as waste material or scrap.

The barrier layer 8 comprising for example EVOH (ethylene vinyl alcohol) is embedded on both sides in a bonding layer 11 to ensure an adequate join to the regenerated material 10 or to the inwardly disposed outer layer 9 of polyethylene.

In the illustrated embodiment of the fuel container 1 according to the invention the inside wall 6 is of a triple-layer nature, with a layer of regenerated or reclaimed material being embedded between two outer layers of polyethylene.

Referring now again to FIG. 2, the diagrammatic section therein, just for illustrative purposes, shows various openings which are generally identified by reference numeral 12 and which can be provided for example to receive a sensor, a venting valve or a filling connection or also for receiving a delivery unit. For example, the large opening which is provided at the top side of the fuel container 1 could accommodate a delivery unit comprising a surge or swirl pot and a fuel pump disposed therein. As the fuel container 1 and the fitments thereof have to be designed nowadays with an eye to service life, it is possible for example for the opening for passing therethrough the fuel conduits and electric lines which are connected to the fuel delivery unit to be selected to be of smaller diameter than is otherwise usual, as the fuel container 1 according to the invention affords the possibility of placing those fitments in the fuel container 1 and securing them in position before the shell portions 2a, 2b are assembled.

The openings 12 in the fuel container 1 are obtained by means of wall-to-wall welds 13. In the regions identified by reference numeral 13 in FIG. 2 the molding tool has been operative to apply the outside wall 5 and the inside wall 6 of the container against each other and to weld them together so that in that region, after the shell portions 2a, 2b are removed from the respective molding tool, it was possible to provide calibrated openings 12, by means of a suitable post-machining or treatment procedure.

It will be appreciated that such wall-to-wall welds may also be provided for other purposes in the shell portions 2a, 2b, for example merely for the purposes of reinforcing the container walls 5, 6 in critical regions or in order to provide mountings in the inside wall of the container 6, for accommodating fitments, hoses, cables or the like. Manufacturing the shell portions 2a, 2b which form the fuel container 1 by means of an extrusion blow molding process has the advantage that the fuel container 1 can be of virtually any desired outside contour and also inside contour. In comparison therewith, producing the fuel container 1 in one piece in the form of a blow molding entails the disadvantage that the internal contour of the container can be only limitedly influenced.

The container structure shown in FIG. 2 has reinforcing ribs indicated at 14, which are formed by wall-to-wall welds, to stiffen the container walls 5 and 6. The ribs 14 are provided more particularly in the upper shell portion 2a in the inside wall 6 of the container and in the lower shell portion 2b in the outside wall 5 of the container. The reinforcing ribs 14 may extend longitudinally, transversely, diagonally or in various patterns on the walls 5 and 6 of the container.

FIG. 2 also shows in only diagrammatic form a surge or swirl pot for accommodating a delivery unit (not shown). In a familiar aspect of fuel container design, the surge or swirl pot 15 forms a fuel reservoir for a fuel pump, such as to ensure that fuel continues to be supplied to the fuel pump when a vehicle in which the fuel container is fitted is negotiating a bend or curve or is involved in similar acceleration conditions. In the case of a fuel tank which is produced in one piece by blow molding, the surge or swirl pot 15 is either incorporated into the tank by the tank being blow molded therearound or the surge or swirl pot 15 is subsequently fitted into the tank through a suitable opening. In both cases it is necessary for the surge or swirl pot 15 to be secured to the inside wall of the container by suitable retaining means. In the case of the multi-part configuration of the fuel container 1 in accordance with the invention, that is no longer necessary, as in that case the surge or swirl pot 15 can be joined to the inside wall 6 of the container in positively locking relationship or by joining of the materials involved, prior to the shell portions 2a, 2b being fitted together.

FIG. 2 shows purely by chance reinforcing ribs 14 which extend under the surge or swirl pot. It will be appreciated however that support for a surge or swirl pot and a fuel delivery unit disposed therein does not necessarily require reinforcement of the wall of the fuel container.

Reference numeral 16 in FIG. 2 denotes a holding portion which is provided for example for receiving and securing conduits which are laid in the fuel container 1. The holding portion 16 can equally be welded, glued or latched to the inside wall 6 of the container before the shell portions 2a, 2b are fitted together. Such a holding portion can also be provided in the form of an insert portion which was introduced into the blow molding mold in the blow molding procedure and which involved an intimate join to the preform upon expansion of the preform in the blow molding mold.

Figure 4:
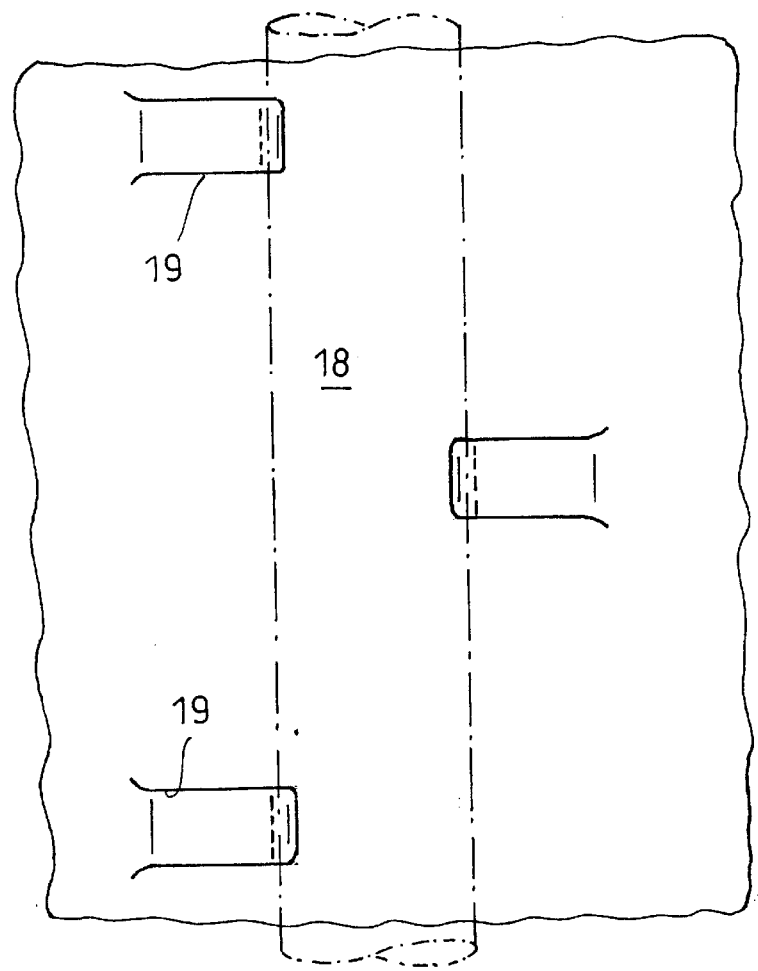
FIG. 4 is a view similar to FIG. 3 of an alternative embodiment of the inside wall of the container in that region.

As was also mentioned hereinbefore in quite general terms, clip mountings 17 can also be provided in the inside wall 6 of the container, for fixing fuel conduits as indicated at 18 in FIGS. 3 and 4. Possible alternative forms of fixing for a fuel conduit or hose 18 are shown in FIGS. 3 and 4. The clip mountings 17 are each formed by resilient holding tongues indicated at 19 in FIG. 4 which are respectively disposed in mutually opposite relationship at their ends in pairs as shown in FIG. 3 or which can be arranged in mutually opposite displaced relationship, as shown in FIG.

4. They are formed in the wall of the blow molding by virtue of the blow molding mold being of a suitable configuration for that purpose. Before the shell portions 2a, 2b are fitted together the fuel conduit can be clipped in place in the case of the embodiment shown in FIG. 3 or it can be threaded into place in the case of the embodiment shown in FIG. 4.

The gap which is kept free between the walls 5 and 6 of the container can serve on the one hand as a ventable diffusion barrier for hydrocarbons, for which purpose for example it is possible to provide air intake and air outlet openings which communicate with an activated carbon filter, while on the other hand the gap 7 can also be used as noise damping for the fuel moving in the fuel container.

It will be appreciated that the above-described embodiment of the container in accordance with the invention has been set forth solely by way of example and illustration of the principles thereof and that various other modifications and alterations may be made therein without thereby departing from the spirit and scope of the invention.

What is claimed is:

1. A double-wall fuel container of plastic material comprising
    at least first and second elements in shell form which are joined together by joining of the materials thereof,
    wherein the elements are each in the form of a double-wall blow molding which are respectively co-extruded in a multi-layer configuration at least in a region-wise manner,
    wherein a gap is kept free at least in a region-wise manner between the respective walls thereof.
2. A fuel container as set forth in claim 1
    wherein the double-wall elements are each in the form of shell portions which are welded together to form the fuel container.
3. A fuel container as set forth in claim 1
    wherein the walls of the elements are each at least in a region-wise manner of a laminate with at least one barrier layer for hydrocarbons.
4. A fuel container as set forth in claim 1
    wherein said elements have wall regions which form the outsides of the container, and including
    barrier layers for hydrocarbons only in said regions which form the outsides of the container.
5. A fuel container as set forth in claim 1
    wherein the elements are in the form of hollow moldings defining a cavity, and including
    means for venting the cavity.
6. A fuel container as set forth in claim 5 including
    a filter element, and
    means communicating the cavity of the elements respectively with the filter element.
7. A fuel container as set forth in claim 1 including
    passages, subdivision means and reinforcing means in the container wall formed by welding wall regions of the elements, which wall regions are arranged in mutually superposed relationship.
8. A fuel container as set forth in claim 1
    wherein regions, which form the inside wall of the container, of at least one element, are profiled to receive conduits and other fitments.
9. A fuel container as set forth in claim 8
    wherein said at least one element is that which in the position of use of the container is the upper element.
10. A fuel container of plastic material, comprising
    a first element in the form of a shell portion,
    a second element in the form of a shell portion, and
    means joining the elements together,
    wherein the elements are each in the form of a double-wall blow molding co-extruded in a multi-layer configuration at least in a region-wise manner, and the respective elements define a gap at least in a region-wise manner between the respective walls of the elements.

* * * * *